United States Patent [19]
Nishikata

[11] 3,793,733
[45] Feb. 26, 1974

[54] ZERO ADJUSTING DEVICE FOR DIGITAL MICROMETER

[75] Inventor: Goro Nishikata, Kawasaki, Japan

[73] Assignee: Yehan Numata, Yokahama, Japan

[22] Filed: Jan. 18, 1972

[21] Appl. No.: 218,761

[30] Foreign Application Priority Data
May 5, 1971 Japan.......................... 46/37554

[52] U.S. Cl.............................. 33/166, 235/144 SS
[51] Int. Cl. ............................................. G01b 5/00
[58] Field of Search... 33/166, 164 R; 235/144 MG, 235/144 SS

[56] References Cited
UNITED STATES PATENTS

| | | | |
|---|---|---|---|
| 981,127 | 1/1911 | Scusa..................................... | 33/166 |
| 458,615 | 9/1891 | Carr............................. | 235/144 MG |
| 2,691,224 | 10/1954 | Thielicke............................. | 33/166 |
| 3,667,127 | 6/1972 | Tsugami.......................... | 33/164 R |
| 806,795 | 12/1905 | Ginet, Jr......................... | 235/144 SS |
| 776,039 | 11/1904 | Veeder .......................... | 235/144 SS |

Primary Examiner—William D. Martin, Jr.
Attorney, Agent, or Firm—Joseph F. Brisebois

[57] ABSTRACT

A zero adjusting device for a digital micrometer comprises a spindle directly connected to a thimble and encircled by a clamp-ring rotatable with said spindle. A gear wheel is disengagably coupled to said clamping-ring by means of an adjusting screw, and an adjusting gear is adapted to be directly coupled to the first stage wheel of a digital indicator interlocked with said gear wheel to be driven thereby. The adjusting gear is spring-biassed away from the first-stage wheel.

3 Claims, 3 Drawing Figures

PATENTED FEB 26 1974  3,793,733

ZERO ADJUSTING DEVICE FOR DIGITAL MICROMETER

SUMMARY OF THE INVENTION

The present invention relates to a zero adjusting device for a digital micrometer.

Conventional micrometers have had such difficulties with the accuracy and zero-adjusting mechanism of digital indicators that they are seldom equipped with such indicators.

The primary object of the present invention is to provide a simple and accurate fine control for the zero adjustment of a micrometer having a built-in digital indicator.

Another object of the present invention is to provide a device for effecting fine control of a micrometer by rotating a digital wheel by means of an adjusting screw, with the interlocking connection between its spindle and digital indicator released.

Several other objects of the present invention will become apparent from a reading of the following detailed description of a preferred embodiment of the present invention, with reference to the accompanying drawings, in which.

DESCRIPTION OF THE PREFERRED EMBODIMENT

Figure 1:
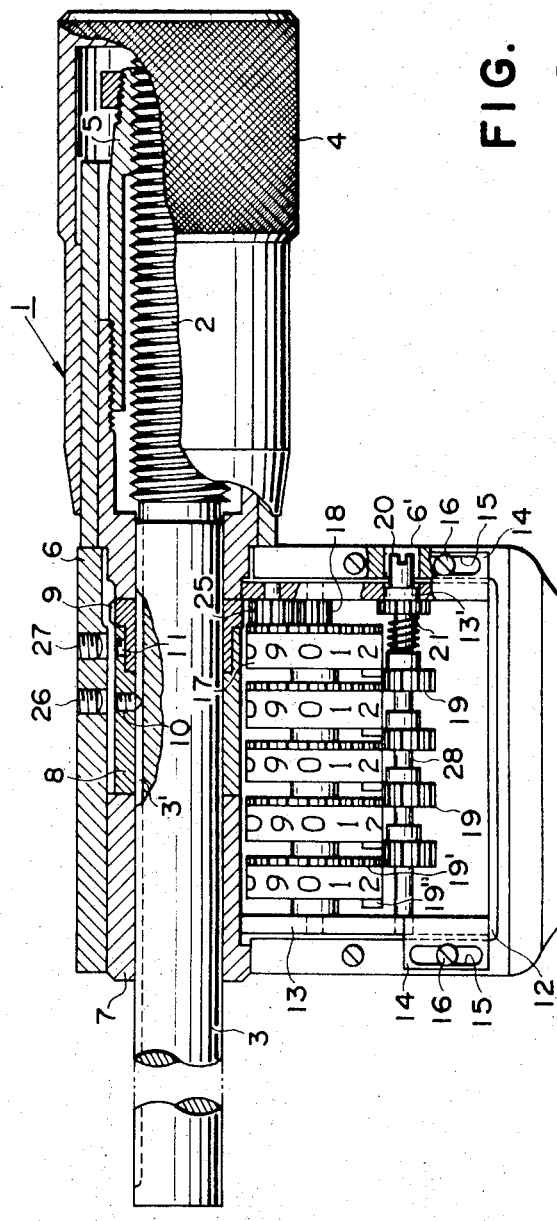
FIG. 1 is a partially cutaway elevational view of the essential parts of a device according to the present invention.

The micrometer head 1 is conventional in construction. The spindle 3 terminating at its inner end in a male screw 2 carries at that end a thimble 4. The male screw 2 engages internal threads in the sleeve 5. The tip of the sleeve 5 is fixed to the frame 6. The top of the frame 6 carries a bushing 7, through which the spindle 3 passes to protrude externally beyond the frame. Between the tip of the sleeve 5 and the inner end of the bushing 7 the spindle 3 rotatably carries a clamp-ring 8 and a gear wheel 9. The clamp-ring 8 is prevented from turning by a key screw 10 in said clamp-ring 8 which projects into the longitudinal keyway 3' of the spindle 1. The gear wheel 9 is attached to the clamp-ring 8 by the adjusting screw 11 in said clamp-ring 8.

The frame 6 has a recess 12, which holds a casing 13 in which digital indicator wheels are rotatably mounted. The casing 13 has flanges 14, which are provided with long slots 15, 15 extending parallel to said gear wheel, and screws 16, passing through said slots into the frame 6 hold said casing 13 immovable.

Figure 2:
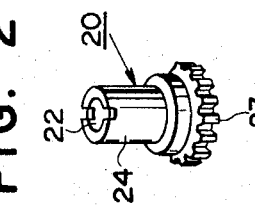
FIG. 2 is an oblique view of the adjusting screw in the device.
Figure 3:
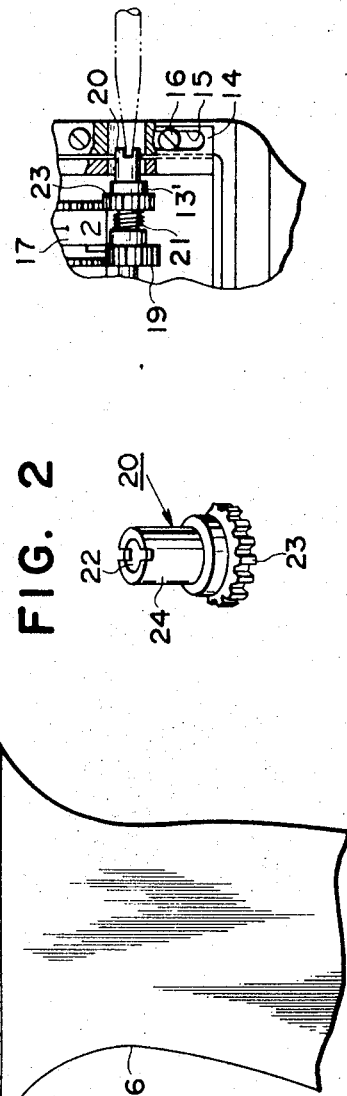
FIG. 3 is a partial view on an enlarged scale illustrating the operation for zero adjustment.

The casing 13 rotatably carries five digital indicator wheels 17 which are separately rotatable, each wheel having on one side a gear 19' and on the other side a pin 19''. In the drawings, the first wheel 17 on the right carries a pinion 18 which rotates with it. Four separately rotatable pinions 19 are mounted on support shaft 28 between the digital indicator wheels 17. These pinions mesh simultaneously with the gear of one and the pin of the other of two adjacent indicator wheels. Between the first pinion 19 on the right and the wall of the casing 13 is pivoted an adjusting gear 20, biassed against said wall by a spring 21. As seen in FIG. 2, the adjusting gear 20 is cylindrical with a hole 22 therein which receives said support shaft 28. This gear 20 comprises a gear portion 23 at one end and a keyway portion 24 at the other end adapted to receive a screwdriver. This keyway portion 24 fits into the holes 13', 6' of the casing 13 and the frame 6 respectively.

An additional pinion 25 is rotatably mounted in the casing between said pinion 18 and said gear wheel 9 in a position simultaneously meshing with both the pinion 18 and the gear wheel 9.

A cover provided with a window is screwed to the top of the frame. When the spindle 3 is turned by gripping the thimble 4, the engagement of the key screw 10 in the keyway 3' causes simultaneous rotation of the clamp-ring 8, the gear wheel 9, the pinion 25, which meshes with said gear wheel 9, and finally the pinion 18 of the digital indicator. The rest of the operation is the same as in conventional digital devices. The spindle rotation is successively transmitted to turn the individual digital indicator wheels.

For the purpose of zero adjustment, the cap screw 27 on top of the frame 6 is removed and the spindle turned to bring the adjusting screw 11 to a position beneath the cap screw hole. The adjusting screw 11 in the cap screw hole is withdrawn sufficiently to release it from engagement with the clamp-ring 8. Then a screwdriver is inserted into the hole 6' in the frame and used to press the adjusting screw 20 against the press-spring 21 until the gear portion 23 of said adjusting screw comes into engagement with the gear 19' of the first digital indicator wheel 19. Then, regardless of the position of the spindle 3, the digital indicator wheel can be turned and its position relative to the spindle 3 adjusted. Thereafter the screw 11 is tightened to again fasten the clamp-ring to the gear wheel.

If the engagement between the key screw 10 and the spindle keyway 3' is to be adjusted, the cap screw 26 is removed and the key screw 10 turned to attain adequate engagement.

If it is necessary to adjust the engagement between the gear wheel 9 and the pinion 25, the casing 13 is shifted along the longitudinal slot 15 and the screw 16 tightened in an appropriate position. As described above, the clamp-ring and the gear wheel can be disconnected from each other by turning a screw and, in this state, the digital indicator wheel can be externally adjusted easily by turning an adjusting screw which is normally held free of said wheel by a spring. Thus the present invention provides a digital micrometer characterized by fine control and high accuracy.

I claim:

1. In a micrometer comprising a spindle mounted to be linearly advanced in a sleeve in response to rotation of a thimble, and digital indicator means for indicating the movement of said spindle relative to said sleeve, the improved zero adjusting device for said digital micrometer which comprises:
   a clamp ring encircling said spindle and means accessible from outside said sleeve for coupling said clamp ring to said spindle, and uncoupling said clamp ring to permit relative axial motion between said clamp ring and spindle.
   a gear wheel, and means accessible from outside said sleeve for coupling said gear wheel to said clamp ring to rotate with said clamp ring and spindle, and for uncoupling said gear wheel to permit only relative rotational movement between said gear wheel and clamp ring, a plurality of digital indicator wheels rotatably mounted to be successively driven by said gear wheel; and an adjusting gear movable from outside said micrometer between a first position in engagement with a first one of said digital indicator wheels and a second position free from such engagement, and spring means biassing said adjusting gear toward said second position.

2. A micrometer as claimed in claim 1, in which said adjusting gear is carried on a supporting shaft which also carries a plurality of pinions, each in engagement with one of said digital indicator wheels.

3. A micrometer as claimed in claim 2, in which said adjusting gear is a cylinder having a hole therein which receives said supporting shaft, said adjusting gear having a gear portion at one end and a notch for receiving a screw at the other end.

* * * * *

UNITED STATES PATENT OFFICE
CERTIFICATE OF CORRECTION

Patent No. 3,793,733    Dated 26 February 1974

Inventor(s) GORO NISHIKATA

It is certified that error appears in the above-identified patent and that said Letters Patent are hereby corrected as shown below:

[30]    Foreign Application Priority Data

May 10, 1971    Japan..........SHO 46/37554

Signed and sealed this 11th day of June 1974.

(SEAL)
Attest:

EDWARD M. FLETCHER, JR.
Attesting Officer

C. MARSHALL DANN
Commissioner of Patents